Nov. 15, 1927.

C. E. GLESSNER 1,649,303

OPTICAL INSTRUMENT

Filed May 24, 1926

INVENTOR
C. E. Glessner

Patented Nov. 15, 1927.

1,649,303

UNITED STATES PATENT OFFICE.

CHARLES E. GLESSNER, OF PORTLAND, OREGON.

OPTICAL INSTRUMENT.

Application filed May 24, 1926. Serial No. 111,210.

This invention relates generally to optics, and particularly to a special form of binoculars.

The main object of this invention is to construct a binocular having improved magnification, light transmitting power, and field of view.

The second object is to so construct the binoculars that it is practical to employ more than eight powers without the use of steady arms by holding the objectives and oculars in approximately the same transverse plane instead of having the objectives in advance of the oculars, as has always been the case.

The third object is to so construct the binoculars that their sides can be telescoped for compactness when not in use, but when in use are fully extended at all times, the adjustment being made with the usual knurled adjusting screw.

The fourth object is to facilitate the location of the object, as well as the holding of same within the field of view, by making the operation of holding the instrument as easy as looking through an ordinary pair of spectacles.

Figure 1:
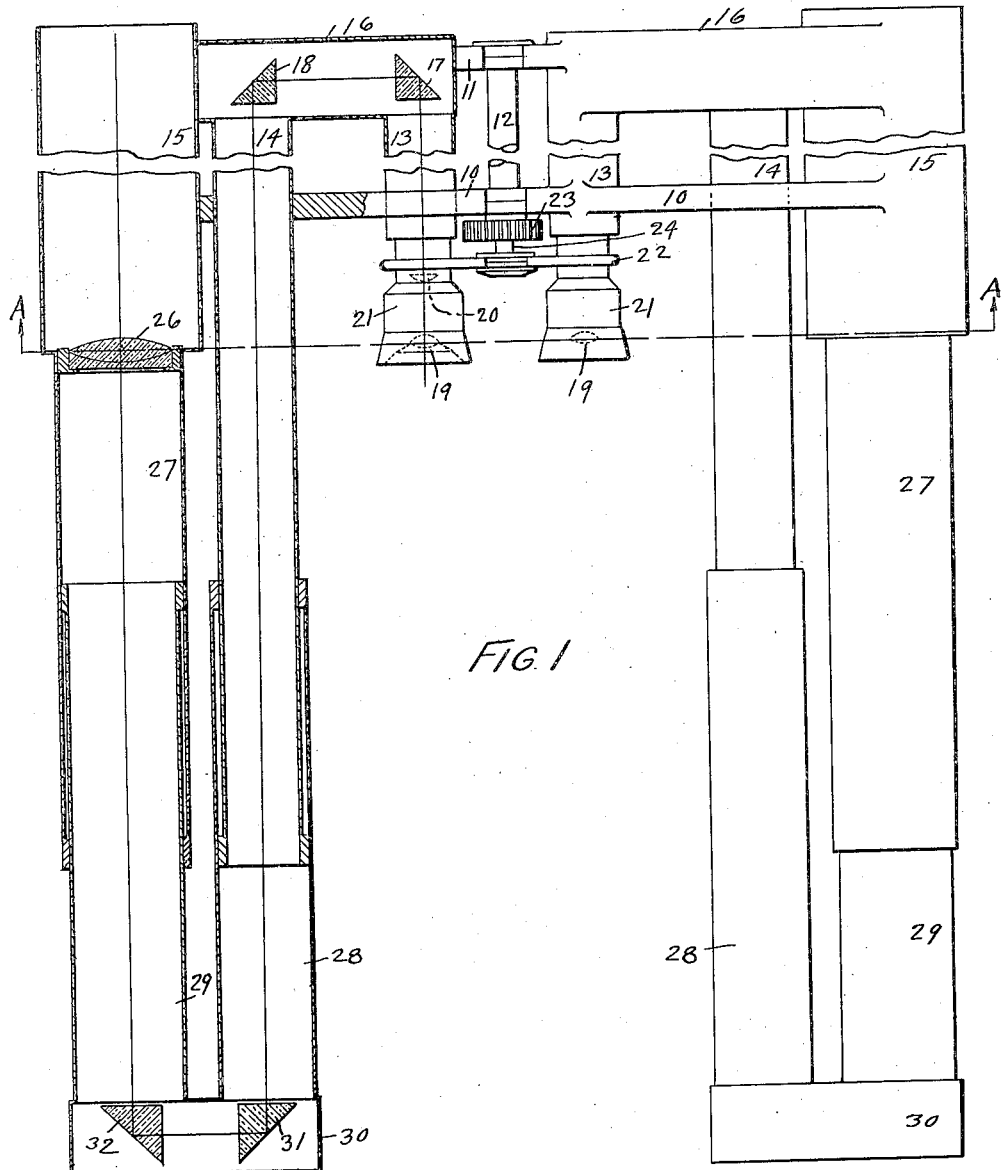
Figure 2:
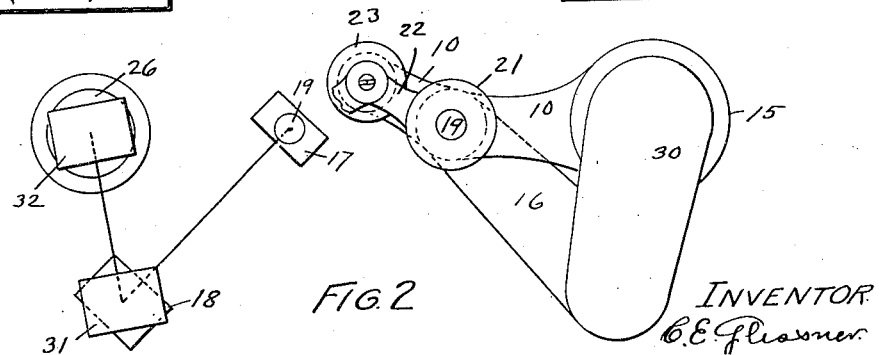

These, and other objects, will become more apparent from the specification following as illustrated in the accompanying drawing, in which:

Figure 1 is a plan of the binoculars showing one half broken away in section and showing its various tubes developed into a horizontal plane. Figure 2 is an end elevation from the observer's end of the binoculars, showing one half thereof diagrammatically in order to show the lines of sight between the various lenses and prisms. In this view the various telescoping tubes are shown in their preferred relation.

Similar numbers of reference refer to the same parts throughout the views.

Referring in detail to the drawing, on the cross frames 10 and 11 on each side of the pivot 12 are mounted the tubes 13, 14 and 15. The tubes 13 and 14 are joined by the prism box 16 which contains the prisms 17 and 18. Each tube 13 connects with the ocular glasses 19 and 20 whose holders 21 are attached to the cross bar 22 which can be moved by the rotation of the knurled screw 23 on the stem 24 in the pivot 12. The members 10 and 11 are hinged on the pivot 12 after the fashion of ordinary binoculars.

The tube 15 is, in reality, a shade for the objective 26 in the tube 27 to which it is rigidly attached. That is to say—the members 13, 14, 15 and 27 are rigid with relation to each other, but can swing on the pivot 12.

Over each tube 14 is placed a telescoping tube 28 and over each tube 27 is placed a telescoping tube 29. Each tube 28 is attached to its adjacent tube 29 by means of a prism box 30 which contains the prisms 31 and 32.

It will be understood that the eye of the observer must be near the eye piece 19 and that the objectives are in the same transverse plane with the oculars, and that is, along the line A—A in Figure 1.

It is also to be noted that the prisms 31 and 32 are behind the eye of the observer, making it possible to look forwardly through the objective, even in its relatively rearward position.

Means for adjustment between the two eye pieces 19 are not indicated since such features are well understood in the art. Only sufficient parts are illustrated to clearly set forth the present invention.

Obviously the principle employed herein need not be confined to binoculars, but applies equally well to telescopes and other monoculars such as microscopes, cameras, etc., the chief advantage of its use arising from the fact that the distance between the oculars and objective, measured parallel to a line between the eye and the object being viewed, is practically eliminated. This overcomes the main objection to high powered glasses, owing to the difficulty of holding same against vibration.

It will, of course, be understood that the tubes 14 and 28 must be spaced sufficiently far apart to allow the observer's head easy passage between same.

In some constructions it will be preferable to also telescope the tubes 27 into the tubes 15 instead of uniting the tubes, as shown, for self-evident reasons.

By the above construction there is secured an optical instrument which is very well balanced, due to the fact that the weight of same is distributed almost equally on opposite sides of the lenses, thereby greatly expediting the holding of the instrument with sufficient steadiness to secure good results even when high powers are employed.

I am aware that binoculars and other optical instruments employing reflecting prisms are of themselves not new; I therefore do not claim such devices broadly, but I do intend to cover all such forms and modifications thereof as fall fairly within the appended claims.

I claim:

1. An optical instrument having objectives and oculars with suitable mountings and adjustments therefor; reflectors between said objectives and oculars, said objectives and oculars lying in the same transverse plane.

2. An optical instrument having objectives and oculars in approximately the same transverse plane; and having reflecting prisms in front of said oculars and other prisms behind said objectives.

3. An optical instrument having a centrally hinged frame each side of which carries three tubes, the first carrying an eye piece, the second mounted alongside of the first; a pair of prisms for reflecting light from said second tube to said first tube and into the eye piece; a third tube also mounted in said frame above said second tube and approximately horizontal with the eye piece; an objective glass in said third tube; a fourth tube telescoping with said second tube; a fifth tube telescoping with said third tube; a pair of prisms for reflecting light from said objective glass into said second tube, said first mentioned prisms being positioned behind the eye piece; and means for adjusting the focus of said glasses.

CHARLES E. GLESSNER.